United States Patent [19]

Reisberg et al.

[11] Patent Number: 4,609,474

[45] Date of Patent: Sep. 2, 1986

[54] AQUEOUS ORGANIC SULFONATE SURFACTANT SYSTEMS CONTAINING PHENYLETHERSULFONATE COSURFACTANTS

[75] Inventors: Joseph Reisberg, Houston, Tex.; Hendrik T. Verkouw, Frankfurt am Main, Fed. Rep. of Germany; Theodorus A. B. M. Bolsman, CM Amsterdam, Netherlands

[73] Assignee: Shell Oil Company, Houston, Tex.

[21] Appl. No.: 678,841

[22] Filed: Dec. 6, 1984

Related U.S. Application Data

[63] Continuation-in-part of Ser. No. 526,725, Aug. 26, 1983, abandoned.

[51] Int. Cl.[4] .............................................. E21B 43/22
[52] U.S. Cl. .............................. 252/8.55 D; 166/275; 252/353; 260/512 R
[58] Field of Search ................. 252/8.55 D, 353, 549, 252/558; 166/273, 274, 275; 260/505 R, 512 R

[56] References Cited

U.S. PATENT DOCUMENTS

| | | | |
|---|---|---|---|
| 3,004,006 | 10/1961 | King et al. | 528/180 X |
| 3,508,612 | 4/1970 | Reisberg et al. | 252/8.55 X |
| 3,943,059 | 3/1976 | Chiu | 252/8.55 |
| 4,110,229 | 8/1978 | Carlin et al. | 252/8.55 |

FOREIGN PATENT DOCUMENTS 0060079 9/1982 European Pat. Off. .

*Primary Examiner*—Herbert B. Guynn

[57] ABSTRACT

An aqueous organic sulfonate surfactant system containing an alkylpolyalkoxyphenylethersulfonate cosurfactant has a salt tolerance comparable to one containing NEODOL ® 25-3S and has greater heat stability.

4 Claims, No Drawings

AQUEOUS ORGANIC SULFONATE SURFACTANT SYSTEMS CONTAINING PHENYLETHERSULFONATE COSURFACTANTS

RELATED APPLICATION

This application is a continuation-in-part of patent application Ser. No. 526,725 filed Aug. 26, 1983, now abandoned.

BACKGROUND OF THE INVENTION

The present invention relates to an aqueous surfactant system suitable for use in a wide variety of subterranean reservoirs. More particularly, the invention relates to a particularly heat-stable and salt-tolerant aqueous anionic surfactant system (such as a petroleum sulfonate or other anionic surfactant system) containing a cosurfactant phenylethersulfonate which is capable of providing such tolerances while maintaining a high degree of interfacial activity.

U.S. Pat. No. 3,508,612 (issued more than a decade ago) describes a sulfate ester cosurfactant-containing aqueous petroleum sulfonate surfactant system which is particularly salt tolerant and capable of high interfacial activity at temperatures of less than about 150° F. At higher temperatures the sulfate ester cosurfactants tend to be hydrolyzed to form less efficient alcohols at a rate which is undesirably high. U.S. Pat. No. 3,943,160 describes sterically hindered analogs of such sulfate esters which have both a similar efficiency as a cosurfactant and a greater heat stability within a subterranean reservoir. But, such homologs proved to be less attractive to manufacture and have failed to provide an economically attractive alternative cosurfactant for use in enhanced oil recovery processes. The disclosures of U.S. Pat. Nos. 3,508,612 and 3,943,160 are incorporated herein by reference.

The physical and chemical properties required for an effective cosurfactant are not predictable from the chemical structures of surface active compounds. Many surface active compounds are known to contain structural groups of the type needed for providing an affinity for both oil and water to an extent yielding at least some degree of surface activity as either or both a primary surfactant and/or a cosurfactant. Numerous types of such surface active compounds are described in U.S. patents.

For example, surface active compounds containing structural groups (which may be substituted groups) arranged as, (aryl)—(polyalkoxy)—(alkylethersulfonate), are described in U.S. Pat. Nos. 4,018,278; 4,161,218; 4,194,564; 3,203,491; 4,217,957; and 4,220,204.

Surface active compounds containing structural groups arranged as, (aryl)—(polyalkoxy)—(arylethersulfonate), are described in U.S. Pat. No. 3,977,471.

Surface active compounds containing structural groups arranged as, (alkyl)—(polyalkoxy)—(alkylethersulfonate) are described in U.S. Pat. No. 4,066,124.

Surface active compounds containing structural groups arranged as, (alkyl)—(polyalkoxy)—(arylethersulfonate) and their capability for increasing oil recovery when used in sea water by themselves or mixed with non-ionic surfactants are described in European Patent Application No. 60,079.

The cosurfactant compounds of the U.S. Pat. Nos. 3,508,612 and 3,943,160 mentioned above contain structural groups arranged as, (alkyl)—(polyalkoxy)—(alcohol sulfate ester).

SUMMARY OF THE INVENTION

The present invention relates to an aqueous anionic surfactant system containing an effective amount for providing salt tolerance of a cosurfactant of the formula

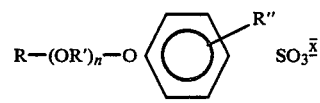

where R is an alkyl radical containing about 10 to 18 carbon atoms, R' is an ethylene radical, R" is a substituent of the group methyl and methoxy radicals and chlorine atoms, n is from about 1 to 5 and $\bar{x}$ is a monovalent cation.

In a preferred embodiment, the aqueous anionic surfactant system consists essentially of a petroleum sulfonate surfactant system containing an amount effective for providing salt tolerance of a cosurfactant of the formula

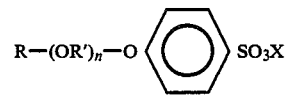

where R is a 10–18 carbon atom alkyl radical, R' is an ethylene radical, n is 1–5 and $\bar{x}$ is a monovalent cation.

DESCRIPTION OF THE INVENTION

The present invention is, at least in part, premised on a discovery that, unpredictably, an alkylpolyalkoxyphenylethersulfonate cosurfactant is capable of providing an aqueous anionic surfactant system (such as a petroleum sulfonate, alkylxylene sulfonate, or other sulfonate surfactant system) having a salt tolerance and interfacial activity substantially equalling such a surfactant system in which the cosurfactant is NEODOL ®25-3S (an ethoxylated primary alcohol sulfate ester, available from Shell Chemical Company, of the type described in U.S. Pat. No. 3,508,612). An aqueous anionic surfactant system in which the heat stability and interfacial tension lowering efficiency of the surfactant are desirably high but the salt tolerance is undesirably low can be converted to a system having a salt tolerance and interfacial tension lowering efficiency at least about equaling those attainable by an incorporation of NEODOL 25-3S without a significant loss of heat stability.

Relative to such sulfate ester cosurfactants, the phenylethersulfonate cosurfactants of the present invention provide the important benefit of being much more resistant to hydrolysis in relatively high temperature reservoirs as well as being commercially feasible compounds to prepare. A particularly suitable cosurfactant of the present invention comprises Dobanol ®25-3 linear $C_{12-15}$ alkyl (ethoxy)$_3$ phenylethersulfonate (an alkylpolyalkoxyphenylethersulfonate available from Akzo Chemie) of the formula

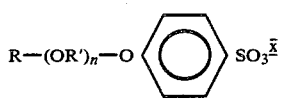

where R is an alkyl radical equivalent to such a radical in a $C_{12-15}$ primary alcohol, R' is an ethylene radical, n is 3 and $\underline{x}$ is a sodium ion.

Numerous surface active compounds have been comparatively tested relative to their efficiency as cosurfactants in aqueous petroleum sulfonate systems. In one type of such tests, a mixture of Witco TRS 10-80 (petroleum sulfonate surfactant having a molecular weight of about 410 available from Witco Chemical Company) and the cosurfactant being tested are titrated with a "Synthetic Brine" until the surfactants are rendered insoluble. The mixture contains 4% by weight of the petroleum sulfonate and 1% by weight of the cosurfactant. The Synthetic Brine is a water solution containing 21.8% sodium chloride, 1.2% calcium chloride dihydrate, 2.2% magnesium chloride hexahydrate and trace amounts of barium and strontium ions. In such tests, the greater the volume of the added brine, the greater is the tolerance of the system. Results obtained with numerous types of sulfonate surfactants are listed in Table 1.

TABLE 1

| Sample Identification | Brine Added, Ml | |
|---|---|---|
| | 23° C. | 75° C. |
| 1. Neodol 25-3S linear $C_{12-15}$ alkyl (ethoxy)$_2$ ethanol sulfate ester | 1.60 | 2.70 |
| 2. Dobanol 25-3 linear $C_{12-15}$ alkyl (ethoxy)$_3$ phenylethersulfonate | 2.40 | 2.85 |
| 3. Dobanol 25-3 linear $C_{12-15}$ alkyl (ethoxy)$_3$ cresylethersulfonate | 0.70 | 1.10 |
| 4. Dobanol 25-6 linear $C_{12-15}$ alkyl (ethoxy)$_5$ ethylethersulfonate | 3.00 | 2.00 |
| 5. Neodol 25-3 linear $C_{12-15}$ alkyl (ethoxy)$_3$ hydroxypropylsulfonate | 0.70 | 1.50 |
| 6. Triton X-200 octylphenylpolyethoxyethylethersulfonate | 0.75 | 1.25 |

The brine tolerance of the sample No. 2, Dobanol 25-3, the alkylpolyethoxyphenylethersulfonate of the present invention, is the highest brine titration value (2.85 ml at 75° C.) yet obtained for any sulfate or sulfonate cosurfactant. The unpredictability of cosurfactant efficiency on the part of chemically similar compounds is exemplified by the extent of the difference between samples 2 and 3 in which the only structural difference is that sample 3 contains one $CH_3$ group attached to the benzene ring of the Dobanol 25-3 linear $C_{12-15}$-alkyl(ethoxy)$_3$ phenylethersulfonate of sample 2. Frequently, in such tests, the measured electrolyte tolerance is higher at room temperature than at a higher temperature. For example, this is the case with the Dobanol 25-6 of sample No. 4. Such a behavior is usually due to the presence of nonionic constituents that are difficult if not impossible to remove from the surfactant.

Comparative tests of surface activity were performed by a microscopic method based on observations of deformations and stringer formations in small droplets of oil which were deposited within a flowing stream of surfactant. The chemical formulations used in those tests contained 4% of Witco TRS-10 surfactant and 1% of the Dobanol 25-3 phenylethersulfonate cosurfactant of the present invention in varying concentrations of the above described Synthetic Brine. For comparison, solutions of the TRS-10 surfactant with the Neodol 25-3S alcohol sulfate cosurfactant as well as solutions of the TRS-10 surfactant with no cosurfactant were also tested. Results, in terms of the effects observed with varying concentrations of the brine, are listed in Table 2.

TABLE 2

| | Concentration Synthetic Brine, % | | |
|---|---|---|---|
| Observation | A | B | C |
| Under Optimum | <12% | <10% | <5% |
| Increasing Activity | 12%–20% | 10%–20% | 5%–10% |
| Optimum Activity | 20% | 20% | 10% |
| Over Optimum | >20% | >20% | >10% |
| System Insoluble | 35% | 40% | 20% |

Formulation Description, Synthetic brine plus:
A - 4% TRS-10 + 1% NEODOL 25-3S
B - 4% TRS-10 + 1% DOBANOL Ethoxy Phenylethersulfonate
C - 5% TRS-10

Such microscopic tests indicate that both the Neodol 25-3S alcohol sulfate cosurfactant and the Dobanol 25-3 phenylethersulfonate cosurfactant of the present invention substantially double the brine concentration requirement for providing optimum surface activity relative to the optimum salinity requirements of the TRS-10 petroleum sulfonate surfactant with no cosurfactant. In addition, those cosurfactants increase the brine concentration that causes surfactant precipitation from the value of 20% (relative to that of the TRS-10 with no cosurfactant) to, respectively, 35 and 40% for the Neodol and Dobanol cosurfactants.

Comparative tests were made of the oil-displacing efficiency of aqueous petroleum sulfonate surfactant systems containing the present Dobanol 25-3 phenylethersulfonate and the Neodol 25-3S alcohol sulfate cosurfactants. Berea cores 10 inches in length and 2 inches in diameter were used with a typical Gulf Coast crude oil at a waterflood residual oil saturation. In each case, the surfactant formulation was injected as a single pore volume flood at a rate of one foot per day at 75° C. The petroleum sulfonate surfactant was Petronate TRS-10. The oil displacement results are shown in Table 3.

TABLE 3

| | Chemical Flood: Petronate TRS-10 in 20% Synthetic Brine plus | |
|---|---|---|
| | 1% DOBANOL 25-3 Ethoxy phenyl-ethersulfonate | 1% NEODOL 25-3S |
| Sor (to 1% NaCl) | 38.3 | 38.4 |
| Viscosity, Chemflood, cp | 15.7 | 10.9 |
| Oil Breakthrough, Vp | 0.25 | 0.27 |
| Final oil saturation @ 1Vp, % Vp | 4.8 | 5.2 |
| Maximum Oil Cut, % | 57.5 | 56.0 |

As indicated in Table 3, both the Dobanol 25-3 phenylethersulfonate of the present invention and the Neodol 25-3S alcohol sulfate cosurfactants exhibited similar behaviors. The oil recoveries as well as the oil cuts were substantially equal, within the limits of experimental error.

In general, the present cosurfactants can be used in substantially any aqueous anionic surfactant systems which are susceptible to surfactant depletion and/or loss of surface activity in contact with relatively high concentrations of total dissolved salts and/or multivalent ion salts. Preferred systems comprise organic sulfonate systems and particularly suitable surfactant systems for use in the present invention comprise aqueous petroleum sulfonate surfactant systems in which the petroleum sulfonates contain from about 15 to 30 carbon atoms, such as those sold by the Sonneborne Chemical Company as Petronates, or, Witco Chemical Company's Witco surfactants, or the like. Particularly preferred sulfonates are mixtures of sodium salts of petroleum sulfonates in the molecular range of about 350 to 420 with those in the molecular weight range of about 420 to 580.

The present cosurfactants can comprise substantially any of the formula

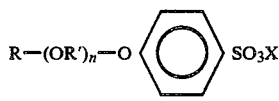

where R is a $C_{10-15}$ alkyl radical, R' is an ethylene radical, n is 1–5 and X is a monovalent cation.

In a preferred embodiment, the aqueous anionic surfactant system consists essentially of a petroleum sulfonate surfactant system containing an amount effective for providing salt tolerance of a cosurfactant of the formula

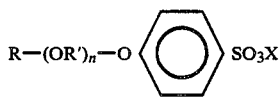

where R is a 10–18 carbon atom alkyl radical, R' is an ethylene radical, n is 1–5 and X is a monovalent cation. In particularly preferred compounds R is a $C_{12-15}$ alkyl radical, R' is an ethylene radical, n is 3 and X is a sodium ion. The Dobanol 25-3 linear $C_{12-15}$ alkyl(ethoxy)$_3$ phenylethersulfonate is especially preferred.

The aqueous liquid used in the present surfactant systems can contain relatively wide concentrations of dissolved monovalent salts and/or multivalent cation salts. The salt concentrations are preferably those which provide an optimum or near optimum range of salinity for the cosurfactant-containing surfactant systems.

Where desirable, the present surfactant systems can be used in the form of aqueous oil-displacing liquids which are relatively dilute and are injected in relatively large volumes. Such solutions can, for example, contain as little as 2% by weight of a surfactant/cosurfactant mixture containing a ratio of about four parts of surfactant to one part of cosurfactant and can be injected in volumes of about 0.25 to 0.5 times the pore volume of the reservoir within the fluid drive pattern.

What is claimed is:

1. An aqueous anionic surfactant system consisting essentially of a petroleum sulfonate surfactant system containing an amount effective for providing salt tolerance of a cosurfactant of the formula.

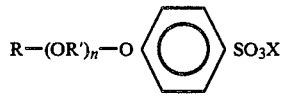

where R is a 10–18 carbon atom alkyl radical, R' is an ethylene radical, n is 1–5 and X is a monovalent cation.

2. The surfactant system of claim 1 in which and n is about 3.

3. The surfactant system of claim 1 in which R is a linear alkyl radical containing 12–15 carbon atoms, n is 3 and X is a sodium ion.

4. A process of increasing the salt tolerance of an aqueous anionic surfactant system consisting essentially of a petroleum sulfonate surfactant system having a relatively high heat stability without significantly reducing the heat stability of the system, comprising:

dissolving in said surfactant system an amount effective as a corsurfactant of a cosurfactant of the formula

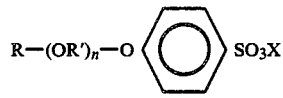

where R is a 10–18 carbon atom alkyl radical, R' is an ethylene radical, n is 1–5 and X is a monovalent cation.

* * * * *